T. PROSSER.
Bee Hive.
No. 20,508.
Patented June 8, 1858.
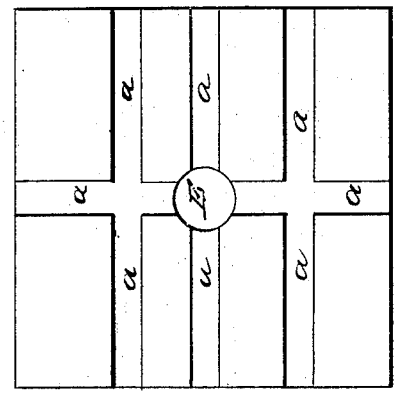
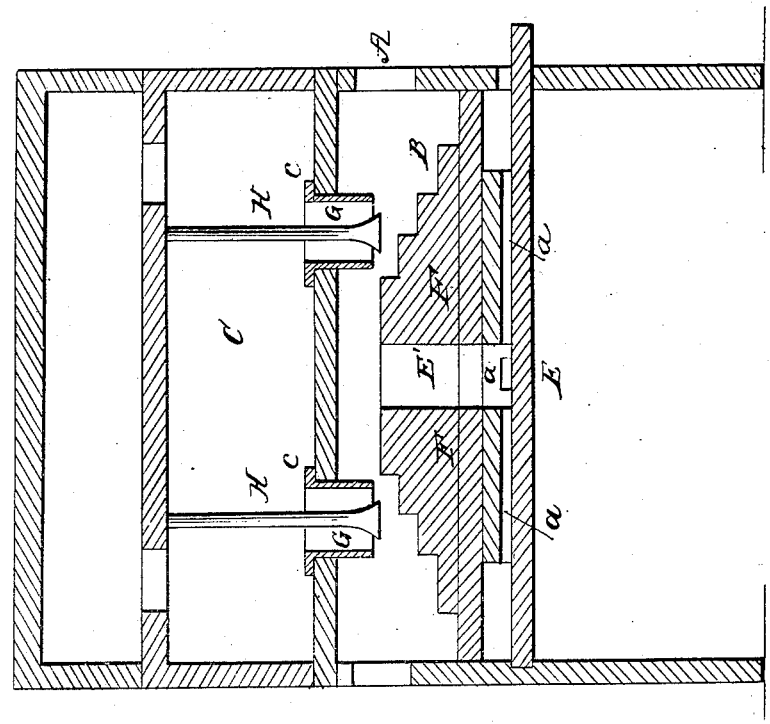

UNITED STATES PATENT OFFICE.

THOMAS PROSSER, OF BIRMINGHAM, PENNSYLVANIA.

BEEHIVE.

Specification of Letters Patent No. 20,508, dated June 8, 1858.

*To all whom it may concern:*

Be it known that I, THOMAS PROSSER, of Birmingham, in the county of Allegheny and State of Pennsylvania, have invented certain new and useful Improvements in Beehives; and I do hereby declare that the following is a full, clear, and exact description of the same, reference being had to the accompanying drawings, forming a part of this specification, in which—

Figure 1, is a vertical central section of a hive constructed with my improvements. Fig. 2, is an inverted plan of the labyrinthian passages.

Similar letters of reference in each of the two figures indicate corresponding parts.

The object of my invention is to effect a perfect exclusion of vermin from the honey.

The nature of my invention consists in providing, intermediate between the external ingress passage and the internal entrance passage to the antechamber of the hive, a series of auxiliary indirect or labyrinthian passages, in combination with isolated suspended shafts and glass covered entrances to the working chamber.

By the above arrangement of labyrinthian passages of antechamber, isolated shafts and glass covered entrances to the working chamber, the bees, by their superior instinct, and capability of flying, have a ready entrance into the ante and working chambers of the hive while the moth or vermin from want of knowledge and a capability of flying are deluded before they reach the ante-chamber, or compelled, if by chance they reach it, to remain therein and die as will be presently set forth.

To enable others, skilled in the art to make and use my invention, I will proceed to describe its construction and operation.

A, represents the hive made with an antechamber B, and working chamber C. On the bottom of the ante chamber B, a step formed elevation F, is constructed. The under side of this elevation is grooved as shown in Fig. 2, or otherwise, so as to form a series of auxiliary indirect or labyrinthian passages *a, a, a*.

E, is a vertical passage in the elevation F, and E′, is the ingress passage which leads to the passage E, and also to the labyrinthian passages *a, a, a*.

By thus forming an elevation in the ante chamber and providing windows in the sides, the bees will not be inclined to work in said chamber and by forming the indirect passages the moth in entering the passage E, will be deluded thereby, and in entering the same will lose the track into the hive, while the bees by reason of their instinct make a direct entrance.

G, G, represent the entrances to the working chamber of the hive. These entrances are formed by inserting glass tubes into holes formed in the bottom of the working chamber, said tubes being confined in place by lips or flanges *c, c*.

H, H, are suspended shafts leading down from the top of the working chamber through the glass entrances G, G, to within a short distance of the top of the elevation F, of the antechamber.

By having the entrance G, G, formed of glass tubes, neither the bees nor moth have a chance to crawl up into the working chamber, therefore it is, that I provide the suspended shafts H, they serving for the bees to alight upon as they fly in through the main passage E′, and then for them to crawl along in passing into the working chamber.

While these shafts answer as aids to the bees, as just stated, they afford no facilities for the moth to enter the working chamber, as their lower ends stand above the elevation F, of the ante chamber, and it is impossible for the moths, even if they reach said chamber, to get upon said shafts, owing to their not being able to fly and light upon the same. And in case they crawl up the sides and along the bottom of the working chamber, they cannot effect an entrance on account of the glass entrances extending down some distance below said bottom, and it being impossible for moth or worms to retain their hold upon glass surfaces.

What I claim as my invention and desire to secure by Letters Patent, is—

The combination, in a bee hive of the labyrinthian passages *a, a, a*, suspended shafts H, H, and glass entrances G, G, when said parts are constructed and arranged relatively to each other, in the manner and for the purposes herein set forth.

THOMAS PROSSER.

Witnesses:
JOHN McKEE,
A. PATTERSON.